United States Patent [19]

Sugiyama

[11] Patent Number: 5,530,937
[45] Date of Patent: Jun. 25, 1996

[54] GAS LASER APPARATUS

[75] Inventor: Tsutomu Sugiyama, Osaka, Japan

[73] Assignee: Matsushita Electric Industrial Co., Ltd., Osaka-fu, Japan

[21] Appl. No.: 428,745

[22] Filed: Apr. 25, 1995

[30] Foreign Application Priority Data

Apr. 28, 1994 [JP] Japan ................................. 6-091295

[51] Int. Cl.$^6$ ....................................................... H01S 3/00
[52] U.S. Cl. ................................. 372/38; 372/58; 372/82; 372/37
[58] Field of Search ..................... 372/38, 58, 82, 372/37

[56] References Cited

U.S. PATENT DOCUMENTS

| 4,734,841 | 3/1988 | Elliott et al. ............................... 363/21 |
| 5,295,149 | 3/1994 | Terai et al. ................................. 372/58 |
| 5,454,003 | 9/1995 | Murata et al. .............................. 372/37 |

FOREIGN PATENT DOCUMENTS 2430107   1/1980   France .
3-48778   3/1991   Japan .

OTHER PUBLICATIONS

IBM Technical Disclosure Bulletin; vol. 18, No. 8; Jan., 1973; p. 2364.

EDN Electrical Design News; "Conversion Techniques Adapt Voltages To Your Needs"; vol. 27, No. 22; Nov., 1982.

Primary Examiner—Léon Scott, Jr.
Attorney, Agent, or Firm—Panitch Schwarze Jacobs & Nadel

[57] ABSTRACT

A current detector (130) is connected between the negative output terminal (−) of a high voltage DC power source (9) and the ground; the current detector (130) comprises a core (12) which is electrostatically shielded by a grounded conductive cover (15), a coil (11) wound around the core (12) and connected in series between the negative output terminal (−) and an electrode (4b) of a gas laser (1), and a Hall device (13) which is magnetically coupled to the core (12) and sends its output signal to a control signal input terminal (91) of the high voltage DC power source (9) so as to control high voltage output power of the latter.

13 Claims, 7 Drawing Sheets

GAS LASER APPARATUS

FIELD OF THE INVENTION AND RELATED ART STATEMENT

1. Field of the Invention

The present invention relates to a gas laser apparatus, and particularly to a $CO_2$ (carbon dioxide) laser for use in laser cutting work machine or the like.

2. Description of the Related Art

A typical conventional gas laser apparatus is described referring to FIG. 5. The conventional gas laser of FIG. 5 comprises a high voltage DC power source 90, a current regulation circuit 495 having a current regulation device 49 such as triode or the like, a current detector circuit 501, and a laser resonator 1 which is electrically connected in series with the current regulator device 49 and the current detector circuit 501 across DC output terminals 901 and 902 of the high voltage DC power source 90.

The high voltage DC power source 90 comprises a high voltage step up transformer 48 whose primary winding is connected to a commercial AC power source 45, a high voltage rectifier 47 which is connected to secondary winding of the high voltage step up transformer 48 so as to rectify the AC high voltage and a smoothing capacitor 48 for smoothing the rectified high voltage to be output from a pair of output terminals 901 and 902.

The current detector circuit 501 comprises a resistor 50 of a low resistance connected in series with the current regulation circuit 495 and the laser resonator 1 and an amplifier 51. Voltage across the resistor 50 is amplified by the amplifier 51 and given to one input terminal of a differential amplifier 52 of the current regulation circuit 495. By applying a desired control voltage to the other input terminal 49a of the differential amplifier 52, the current of the laser resonator 1 is set and regulated to a predetermined value corresponding to the desired control voltage given to the input terminal 49a.

The laser resonator 1 comprises an output mirror 2 at one end of an insulator tube 100, a total reflection mirror 8 at the other end of the same and a pair of discharge electrode 4a and 4b disposed near respective ends of the insulator tube 100. Further, the insulator tube is connected via gas conducting tubes 8a and 8b to a blower 6 and a gas cooling device 7 connected in series with the blower 6.

The gas laser medium, for instance $CO_2$ gas, is circulated by the blower 6 in the direction of passing from the blower 6, through the first gas conducting tube 8a, the insulator tube 100, the second gas conducting tube 8b, the gas cooling device 7 and to the blower 6. In the insulator tube 100 of the resonator 1, known glow discharge 5 takes place and laser oscillation is made. The gas heated by the glow discharge is cooled in the gas cooling device 7.

In the operation, for instance, a commercial AC power of 200 V is step up by the high voltage step up transformer 46 to 20–30 kV AC. The high voltage AC current is rectified by a high voltage rectifier 47, thereby to feed DC current of about 50–100 mA to the electrode 4a and 4b for producing the glow discharge 5.

A DC voltage signal corresponding to the amount of the DC current is taken out across the resistor 50 and is applied to the amplifier 51. Output of the amplifier 51 is given to the differential amplifier 52 and controls the current regulation device 49 in such manner that a stable current corresponding to the control voltage applied to the input terminal 49a of the differential amplifier 52 is given to the laser resonator 1. Light oscillated in the laser resonator 1 travels reciprocating between the output mirror 2 and the total reflection mirror 3 and is finally issued outside through the output mirror 2.

In the conventional gas laser apparatus as has been shown in FIG.5 and described, the high voltage step up transformer 46, the high voltage rectifier 47, the smoothing capacitor 48 and so on are contained in a single container and isolated by an insulation oil or insulation liquid from the ground potential.

The gas laser apparatus of the above-mentioned configuration has the below-mentioned problem.

First, generally in a large output power gas laser, the laser oscillation is often stopped or restarted for working with the laser output, by stopping and restarting the glow discharging. At such stopping and restarting of the laser oscillation, potentials of the electrodes 4a and 4b of the laser resonator 1 moves from a low potential to a high potential or vice versa, unstably.

That is, in such gas laser apparatus, at the starts or the stops of the laser oscillation, by the changes of large glow discharge currents in the resonator 1, great potential fluctuations take place thereby making the potential of the resistor 50 vary high or low, thereby sending a great noise to the current regulation circuit 495 through the amplifier 51. Therefore, undesirable noise is inputted to the control signal of the input terminal 49a, or there is induced burning or breakdown or damage of the resistor 50, the amplifier 51 or the differential amplifier 52, thereby causing unstable outputting of the laser light, hence deterioration of work qualities.

Second, when insulation qualities of the insulating member such as insulation oil or insulation liquid and insulators of the high voltage step up transformer 46, the high voltage rectifier 47 or the smoothing capacitor 48 become deteriorated, leakage current flows therearound, in addition to the discharge electrodes 4a and/or 4b. Therefore, the voltage of the discharge current for retaining the glow discharge decreases owing to the leakage, thereby inducing fluctuation of the laser output, hence deteriorating quality of works. In order to avoid such problem, in the conventional way the operation of the gas laser apparatus had to be stopped periodically for checking quality of the insulator and insulating oil or liquid to retain the quality of works.

OBJECT AND SUMMARY OF THE INVENTION

The purpose of the present invention is to solve the above-mentioned problems, to retain good work quality through stabilization of the laser output power of gas laser apparatus, as well as through perpetual serving of the gas laser apparatus without need of the hitherto-made periodical insulation checks.

In order to achieve these objects, a first mode of the gas laser apparatus of the present invention is configured by comprising resistors which are grounded at respective one ends and connected to respective output terminals of a high voltage DC power source at respective other ends, and a current detector including a grounded core, a Hall device, and a coil between one of said output terminal and an excitation part of the laser resonator, whereby the output regulation of the high voltage DC power source is executed responding to the output signal from the Hall device of the current detector. The word "core" in this invention is used to mean any magnetic core including iron core, silicon steel plate core, ferrite core, etc.

Furthermore, resistors having such resistance value that a current flowing therethrough is one-hundredth or less of the discharge current flowing through the discharge are connected at their one ends to respective output terminals of the high voltage DC power source and grounded at their respective other ends.

The current detector is installed in a conductor casing composed of a conductor case and a conductor lid on which a signal line take out hole and insulated terminals are provided, and inside of the conductor case is filled with insulating material. The Hall device signal line and a core grounding line are led out through the signal line take out hole, and both ends of coil are connected to the insulated terminals. The signal line take out hole is covered by a circuit supporting bracket on which the Hall device and a signal amplifier are fixed.

In other mode of the invention, primary side of the high voltage DC power source comprises a high-frequency AC power source, an AC step up transformer, a rectification circuit, and a current detector; then a current detector is provided between the high-frequency AC power source and the AC step up transformer. And by using RMS signal of the current detector or by using a signal obtained by letting the output of the current detector pass through a rectifier and a capacitor, output of the high-frequency AC power source is regulated or changed.

In other mode of the invention, variation of impedance of the AC step up transformer seen from the high-frequency AC power source is detected during the operation of the gas laser. This is carried out by using a power source having switching devices as a low voltage AC power source and providing a current detector between the low voltage AC power source and an AC step up transformer; and a peak detector of current waveform and a pulse generator for driving switching element are connected so as to give their output as inputs of a time difference detector for detecting the occurring time difference of input pulse.

In accordance with the constitution described above, the instability of the potential between the high voltage power source and the discharge electrode is avoided and, the mixing-in of high voltage noise into the current regulation circuit hitherto being caused by flowing to the ground of charge and discharge current of high voltage through a grounding line of the core of the current detector can be prevented. And as the result, possible degradation of the work quality caused by the laser light output instability associated with the instability of the discharge current or damages of the regulation circuit can also be avoided.

Further, the primary current of the AC step up transformer is substantially proportional to the input power inputted by the glow discharge, and accordingly, an amount of the discharge input can be detected by the RMS value or a signal obtained by rectifying and smoothing the waveform. Therefore, stabilization of the laser light output can be achieved and hence the stabilization of work quality can be expected, without accompanying the mixing of high voltage noise into the regulation circuit.

When the insulator in the high voltage DC power source is degraded, its impedance changes due to increase of leak current and the phase difference between input voltage and current of the step up transformer changes. By monitoring the occurring time difference between the peak of the pulse current waveform and the pulse for driving the switching elements, delay time of the current when the voltage pulse is applied to the AC step up transformer can be obtained. Thereby, the degradation state of the insulator can be detected by the current detector provided on the primary side of the above-mentioned step up transformer without stopping the gas laser apparatus and keeping the work processing. This gives an improvement in the rate of operation of the laser apparatus.

According to the gas laser apparatus of the present invention, possible erroneous or anomalous operation or further, damage of the high voltage DC power source and related parts caused by the high voltage noise can be eliminated. And it becomes possible to achieve the stabilization of the discharge current and voltage for the discharge pumping using the glow discharge. This is advantageous for realizing the stability in the quality of working for long continuous without stopping the operation of the gas laser apparatus.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Hereafter the present invention will be elucidated in detail by way of preferred embodiments which embody the present invention.

[First embodiment]

In the following, explanation is given on a first embodiment of the present invention referring to FIG. 1, FIG. 2A, FIG. 2B, FIG. 2C and FIG. 3.

Figure 1:
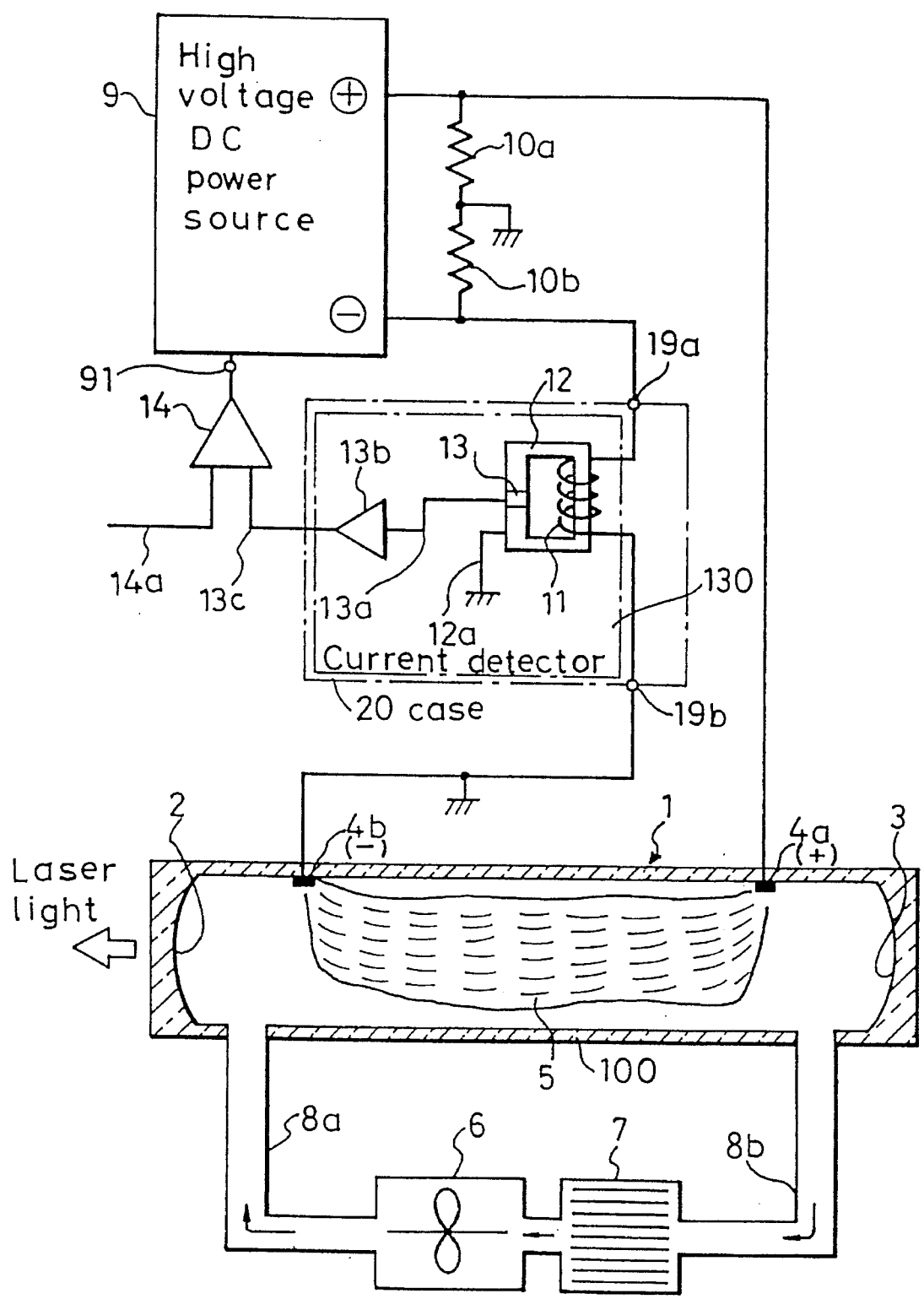
FIG. 1 is a circuit constitution of a gas laser apparatus of a first embodiment of the present invention.

FIG. 1 shows a constitution of a laser apparatus in accordance with a first embodiment of the present invention. A laser resonator 1 comprises of an output mirror 2 and a total reflecting mirror 3 and includes a discharge pumping space which has glow discharge 5 of a gas laser medium. In the discharge pumping space, the gas laser medium is circulated through gas conducting tubes 8a and 8b by a gas blower 6 connected in series with a gas cooler 7 in a similar manner to that explained in the conventional example. The laser resonator 1 is excited by generating the glow discharge 5 between a pair of discharge electrodes 4a and 4b, and thereby the laser oscillation takes place. The oscillating laser light bounces back and forth inside the laser resonator 1, and a part of the laser light is projected out through the output mirror 2.

To define a potential of a high voltage DC power source 9, at output terminals thereof, high voltage-resisting resistors 10a and 10b, of which one ends are respectively grounded, are connected. And a coil 11 wound on a core 12 is connected between a terminal on either one side (here in the drawing, the negative potential side) of the terminals of the power source 9 and the discharge electrode 4b through high voltage insulating terminal 19a and 19b. The coil 11 is wound on the core 12 of a squared C-letter shaped having a gap cut substantially perpendicularly with respect to a looping magnetoflux along the core 12. And inside this gap a Hall device 18 is mounted so as to make magnetic coupling to the core 12.

As shown by FIG. 2A, FIG. 2B, FIG. 2C and FIG. 2D, the core 12 is covered by an electrically conductive cover 15 (e.g. of thin copper plate) for electrostatic shielding. On the conductive cover 15, a slit 15a is provided all the way along the core 12 so as to prevent shortcircuiting of induced current thereon. And at a position corresponding to the position of the Hall device 13, an opening 15b is also provided for leading out an output signal line 13a from the Hall device 13 therethrough.

Figure 2A:
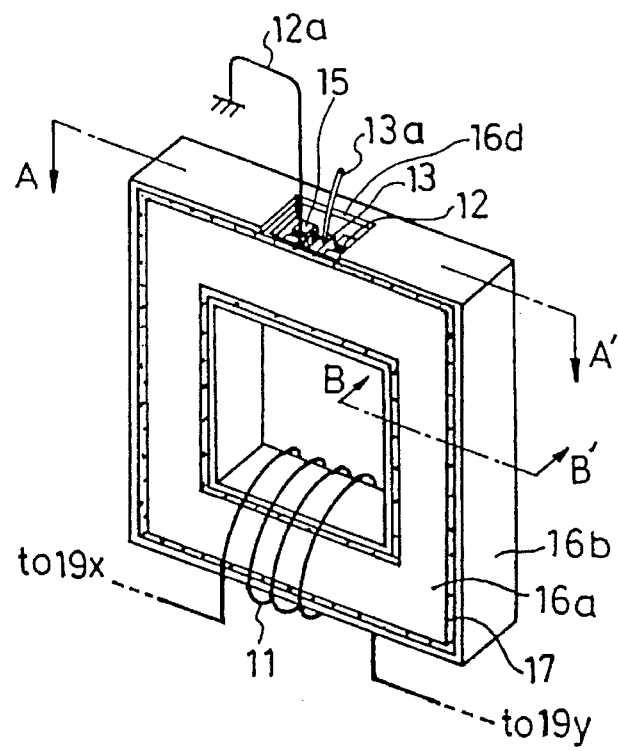
FIG. 2A is an outline external perspective view of a current detector.
Figure 2B:
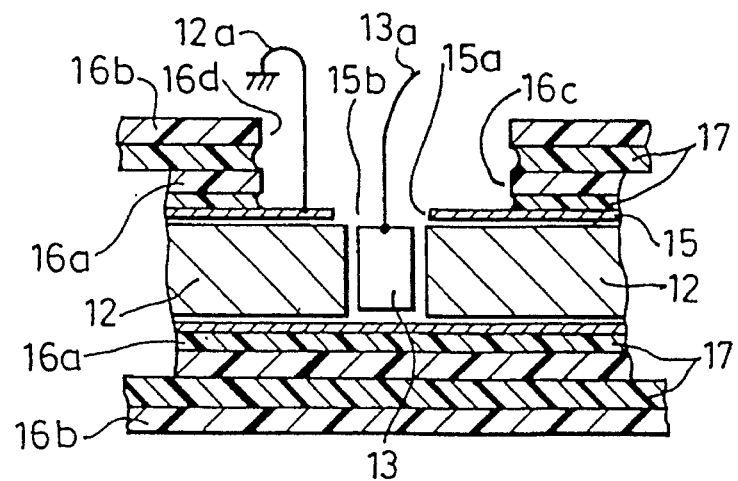
FIG. 2B is a cross-sectional drawing showing the vicinity of a Hall device of a current detector cut by a vertical plane A–A' in FIG. 2A.
Figure 2C:
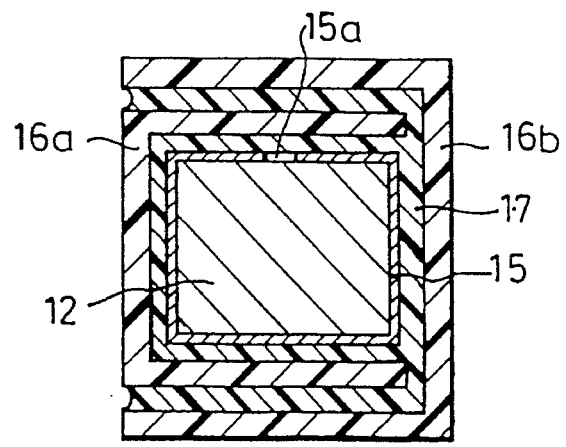
FIG.2C is a cross-sectional drawing of a part of the current detector cut by a horizontal cutting plane B–B' in FIG. 1.

As is shown in FIG. 2C, over the outside of the conductive cover 15, an insulating cover 16a of ceramics having a squared U-letter shaped cross-section is placed, and also further on the outside thereof, another insulating cover 16b of ceramics having an opposite squared U-letter cross-sectional shape is placed so as to embrace the conductive cover 15 by them. On these insulating covers 16a and 16b, openings 16c and 16d are provided respectively at the overlapping positions over the opening 15a on the conductive cover 15. Grounding lines 12a are provided on a part of the conductive cover 15 at the part beside the opening 15b. FIG. 2B is the cross-sectional cut-out enlarged view along a vertical cutting plane A-A' in FIG. 2A. FIG. 2B shows details of the openings 16c, 16d of the core 12 together with the conductive cover 15 and the insulating covers 16a, 16b.

Figure 2D:
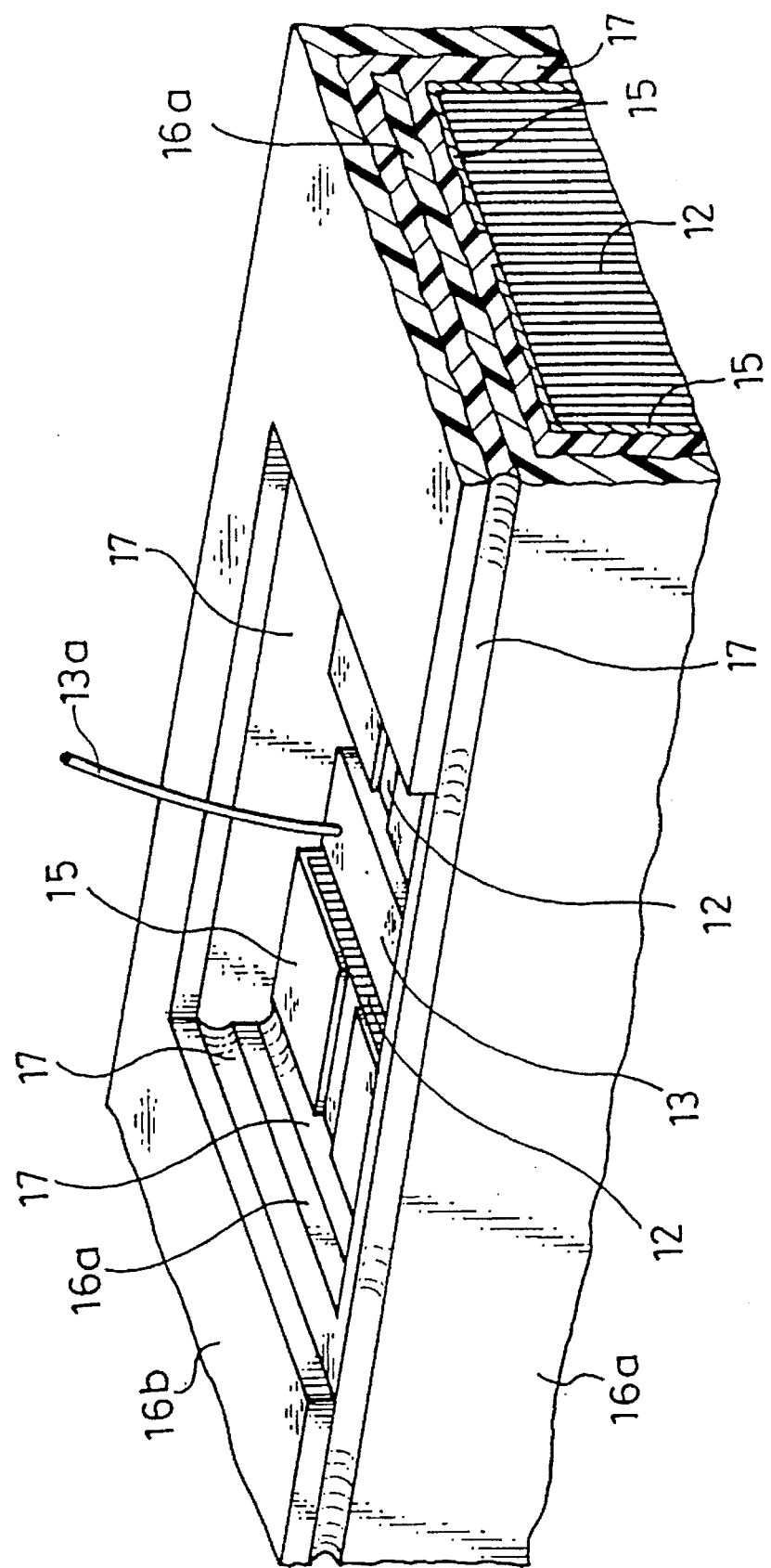
FIG. 2D is an enlarged perspective view showing the detailed configuration of the upper central part of the configuration shown in FIG. 2A.

FIG. 2D is an enlarged perspective view showing the detailed configuration of the upper central part of the configuration shown in FIG. 2A.

Spaces left between these insulating covers 16a, 16b, and conductive cover 15 are filled with an insulating material 17 such as epoxy resin, for example, by utilizing known vacuum impregnation process. FIG. 2C, which is a cross-sectional view of a part of the current detector cut by a horizontal cutting plane B-B' shown in FIG. 1, clearly shows detailed configuration of the core 12 covered by the conductive cover 15 and the insulating covers 16a, 16b. The coil 11 is wound outside of the insulating cover 16b as shown in FIG. 2A.

Figure 3:
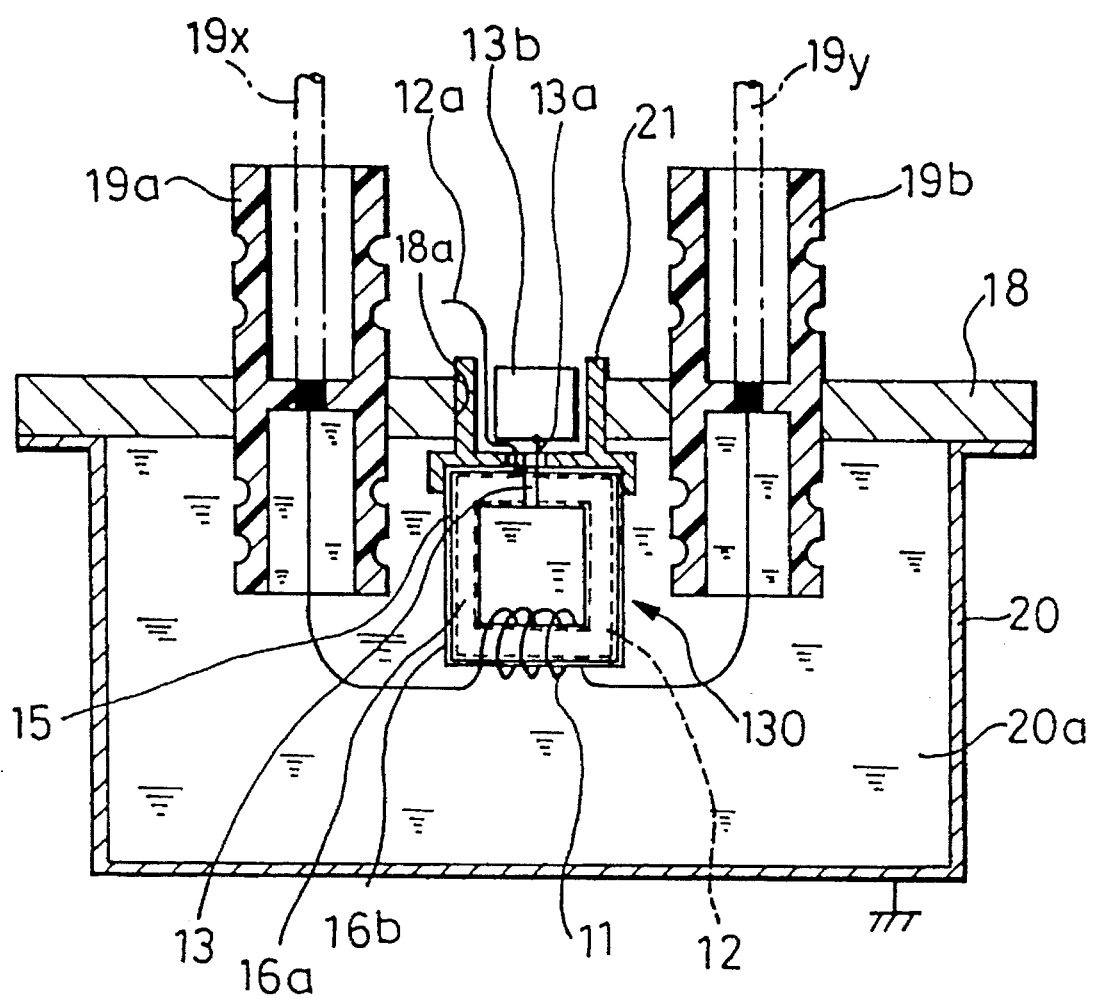
FIG. 3 is a cross-sectional elevation view of the current detector in the first embodiment of the present invention which is encased in a conductor case.

As is shown in FIG. 3, an amplifier-supporting bracket 21 made of metal supports the core 12 contained in the insulating covers 16a, 16b so that a lower half part thereof surrounds the insulating covers 16a and 16b. The upper half of the amplifier-supporting bracket 21 is formed in a cylinder and is inserted into and fixed to a signal take-out through-hole 18a of a metal cover or lid 18 of a metal case 20 which is grounded, and an amplifier 13b is held inside the cylinder and a Hall device signal output line 13a is connected to the amplifier 13b. The grounding line 12a connected to the conductive cover 15 of the core 12 is also led out through the amplifier supporting bracket 21.

As shown in FIG.1 and FIG.3, the core 12 with the coil 11, the Hall device 13, and an amplifier 13b constitute a current detector 130, which is contained in the grounded metal case 20 (i.e. a current detector case 20) and fixed to the metal lid 18 by the supporting bracket 21 as shown in FIG. 3. The lead wires 19x and 19y of the coil 11 are led out through the high voltage terminal insulator sleeves 19a and 19b provided also on the lid 18 and connected to the negative output terminal of the high voltage DC power source 9 and to the electrode 4b of the laser resonator 1. The metal case 20 of the current detector 130 is grounded and is filled with a fluid type insulating material 20a of, e.g., various kinds of resins (epoxy), transformer insulating oil, silicon oil, or sulphur hexafluoride.

When the discharge current flows, magnetic field generated from the coil 11 penetrates the Hall device, and thereby an electric output therefrom corresponding to the magnetic field intensity appears on the output signal line 13a. This output signal line 13a is connected to the amplifier 13b as shown in FIG. 1 and FIG. 3, and an amplified signal is output on the line 13c shown in FIG. 1. Since this amplified signal is substantially proportional to the discharging current flowing through the discharging space of the laser resonator, by taking the difference signal or error signal with respect to a desired current regulation signal in the amplifier 14, its output signal is fed through a regulation signal input terminal 91 as regulation input signal of the high voltage DC power source 9. Then, when a certain difference between the current regulation signal 14a and the amplified signal 13c occurs, the regulation input through the input terminal 91 to the high voltage DC power source 9 adjusts the output high voltage DC power of the high voltage DC power source 9 by, for example, changing the conduction angle of an SCR used therein for the regulation, and thus the output voltage of the high voltage DC power is desirably regulated and kept constant.

Hereupon, the coil 11 is at the same potential as that of the electrode 4b. The core 12 and the Hall device 13 are carefully insulated from the high voltage by the electrostatic isolation by the groundings of the conductive cover 15, the insulating covers 16a, 16b and the filling of insulator 17 (FIG. 2B, FIG. 2C, FIG. 2D). And further, by containing the above-mentioned configuration consisting of the core 12, the coil 11, the Hall device 13, the conductive cover 15 and the insulating covers 16a, 16b in the grounded conductor case 20, the conductor lid 18 and conductor bracket 21, and by further filling the insulting material 20a of FIG. 3 in the conductor case 20, the coil 11 and the Hall device 13 are perfectly insulated from the high voltage and noises of the high voltage.

When variation of the potential of the coil 11 takes place, electrostatic induction is about to be produced and transfer electric charges into and from the core 12 and the Hall device. However, because of the groundings of the conductive cover 15 for covering the core 12, even at such electrostatic induction, no transferrings of electric charges into and from the core 12 and the Hall device 13 occur, and the transferrings in and out of the electric charges takes place only through the grounding line 12a. Owing to this, it becomes possible to exclude the mixing in of high voltage noise into the Hall device.

Respective ends of the high voltage resisting resistors 10a and 10b (FIG. 1) are grounded, and hence the potentials of the output terminals of the high voltage DC power source 9 are determined by a ratio between those resistors 10a and 10b. The grounded conductor case 20 enclose the coil 11 with the grounded potential, and therefore, the electrostatic potential of the coil 11 is fixed stably.

Consequently, undesirable fluctuation of the high voltage applied to the current detector 130, which comprises the coil 11, the core 12, and the Hall device 13, is eliminated. Even when voltage variation occurs owing to the presence and absence of the glow discharge 5, mixing-in of the noise or induction of noise which influences high voltage fluctuation through the Hall device 13 does not take place. Furthermore, since no high voltage noise is mixed into the Hall device 13, damage of the current detector 130 does not occur.

As a result, it becomes possible to eliminate anomalous operation or damage of the high voltage DC power source 9 due to the high voltage noise and also to stabilize the discharge current and discharge voltage for making discharge pumping by the glow discharge.

[Second embodiment]

Figure 4A:
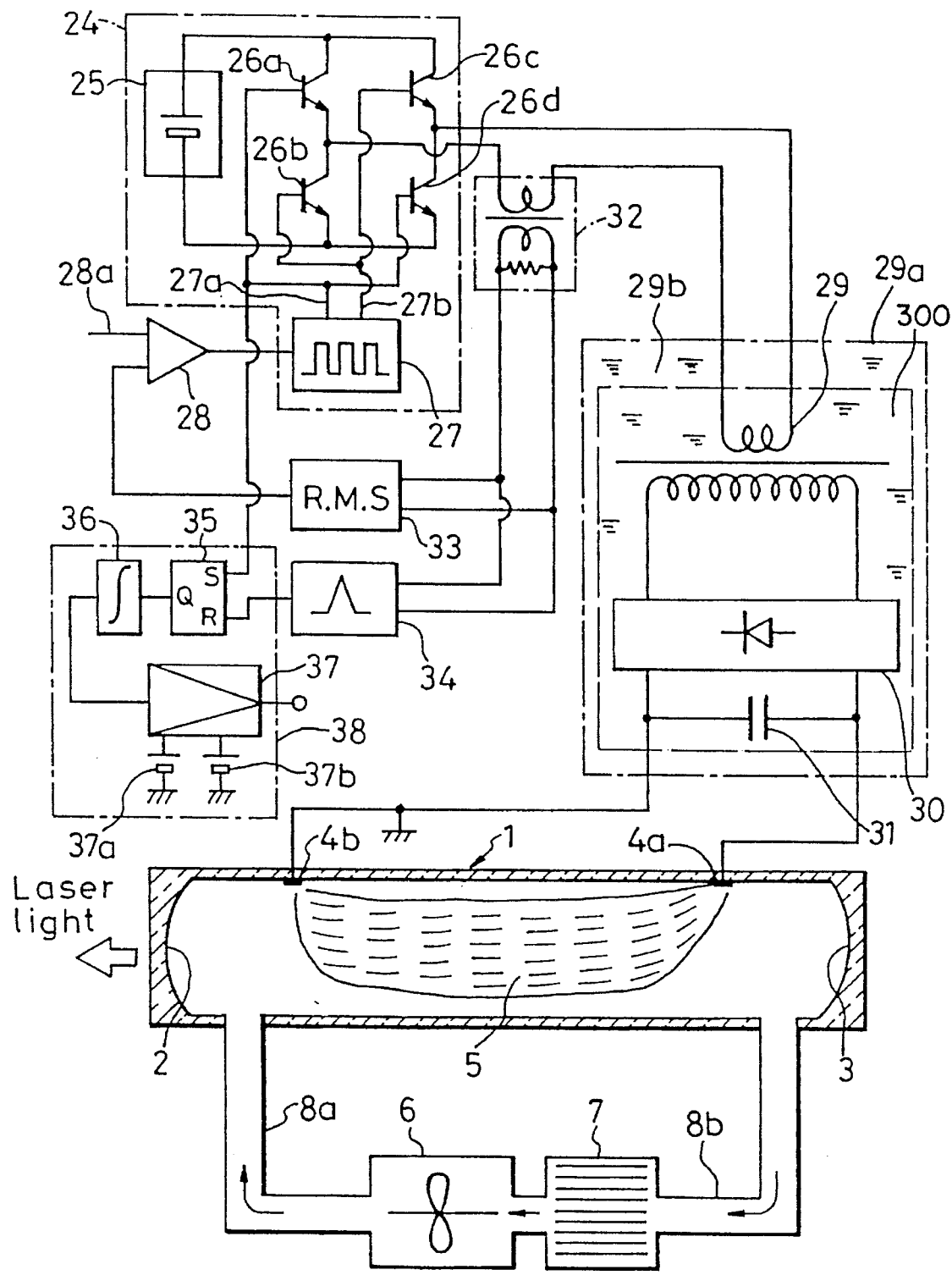
FIG. 4A is a circuit diagram of a gas laser apparatus of a second embodiment of the present invention.
Figure 4B:
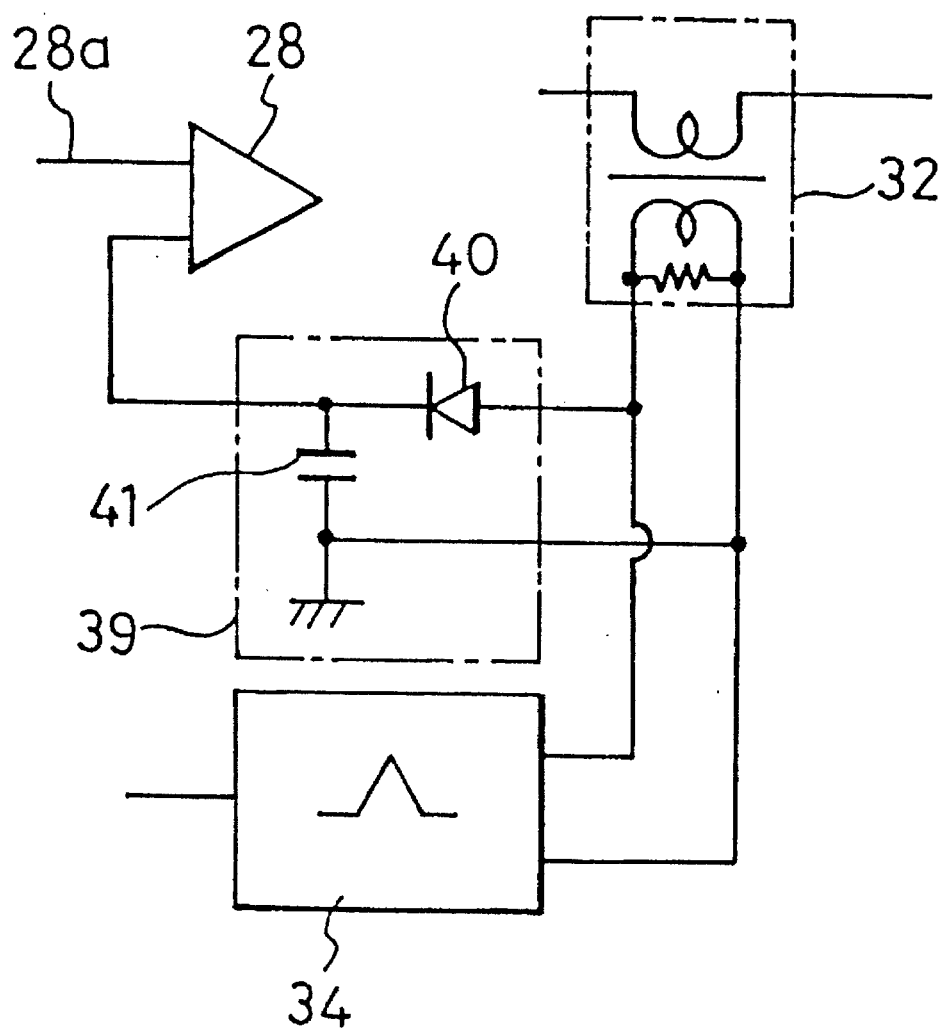
FIG. 4B is a circuit diagram of a third embodiment showing a substitutional part of an RMS arithmetic processor.
Figure 5:
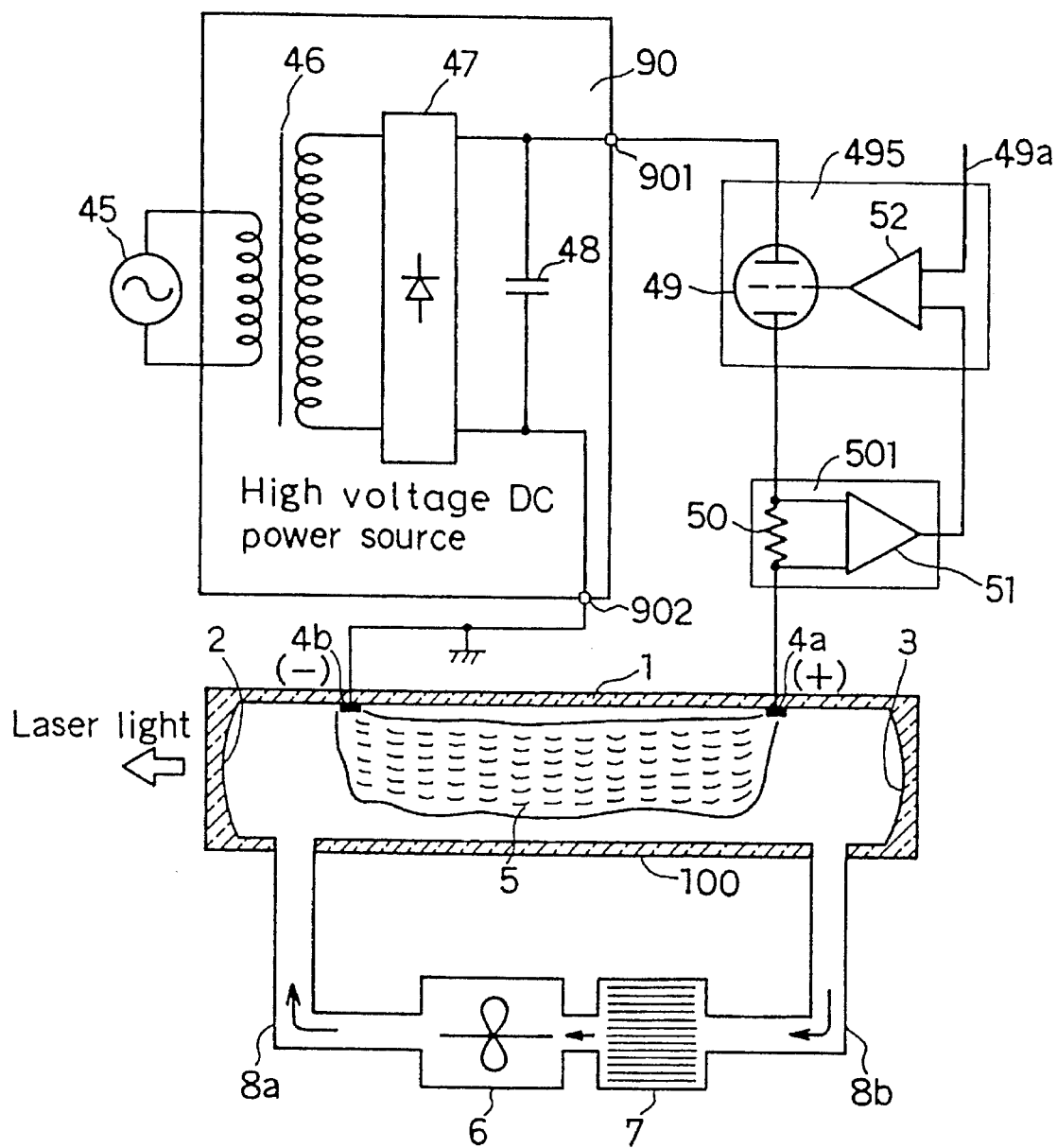
FIG. 5 is an outline circuit constitution illustrating a conventional example.

Next, explanation is given on a second embodiment of the present invention referring to FIG. 4(A) and FIG. 4(B). Explanation of those parts that are common with those in FIG. 1 is omitted here, and for those parts the similar explanation to the above-mentioned first example will apply.

As shown in FIG. 4(A), switching elements 26a and 26b are connected in series with each other across output terminals of a DC voltage source 25. Switching elements 26c and 26d are also connected in series with each other across the output terminals of the DC voltage source 25. A pulse generator 27 changes its output frequency and pulse width of its output pulse trains at driving signal lines 27a and 27b responding to the input signal given from the differential amplifier 28 and generates pulse trains having a half period phase difference with each other.

The driving signal line 27a is connected to control electrode (the base) of the switching elements 26a and 26d, while the driving signal line 27b is connected to the base of the switching elements 26b and 26c. Then respective switching elements are actuated alternatively thereby to convert a DC voltage to an AC voltage. A connecting point between the switching elements 26a and 26b is connected to one end of a current detection transformer 32, and a connecting point between the switching elements 26c and 26d is connected to the one end of a step up transformer 29, and the other end of the current detection transformer 32 is connected to the other end of the step up transformer 29. The circuit part 24 encircled by a chain line comprising the DC voltage source 25, the switching elements 26a, 26b, 26c, 26d and the pulse generator 27 constitutes a high frequency AC power source 24, whose output voltage is regulated and adjusted by the output signal of the differential amplifier 28.

Across the terminals of the secondary side of the step up transformer 29 is connected a high voltage rectification circuit 30, output whereof is further smoothed by a smoothing capacitor 31 connected across the secondary side. And the secondary side is connected to the discharge electrodes 4a and 4b. Thus, low-voltage high-frequency AC voltage is converted into high-voltage high-frequency AC, and after rectification and smoothing a high voltage DC current is impressed on the laser resonator 1. The step up transformer 29, the high voltage rectification circuit 30 including a high voltage rectification diode, and a smoothing capacitor 31 are installed in a common container 29a in which insulation oil 29b is filled.

The AC voltage generator 24, the step up transformer 29, the high voltage rectification 30 and the capacitor 31 together constitute a high voltage DC power source.

The secondary output of the current detection transformer 32 is connected to input terminals of a root mean square (RMS, or effective) value arithmetic processor 33 and also to input terminals of a peak detection circuit 34. The output of the RMS arithmetic processor 33 is, together with an output regulation signal 28a, fed to the differential amplifier 28; and then the output of the differential amplifier 28 is given to the pulse generator 27.

The driving signal 27a is given to the set terminal S of an RS flip-flop 35, whereas the output of the peak detection circuit 34 is given to the reset terminal R of the same, and the output of the RS flip-flop 35 is fed to an integration circuit 36. The output of the integration circuit 36 is fed to a comparison arithmetic processor 37.

The current waveform converted into the signal waveform by the current detection transformer 32 is arithmetically processed to obtain its effective value by the RMS arithmetic processor 33. And, there are substantially a proportional relation between those two values of the primary current effective value (root mean square value) and the discharge output power value. Accordingly, the error signal between the output control reference signal 28a and the output of the RMS arithmetic processor 33 is given to the pulse generator 27 for regulating output. As a result, without connecting the regulation facility directly to the high voltage part to obtain the error signal, the discharge input can be detected. Therefore, the mixing of the high voltage noise into the regulation signal can be avoided. Thus it becomes possible to regulate the high voltage output without connecting directly to the high voltage part.

Furthermore, the peak detection circuit 34 detects absolute peak value in the primary current waveform and generates a pulse at this time position. Since the primary input voltage of the AC step up transformer 29 is generally a rectangular pulse obtained from the switching elements, the phase difference between the primary input voltage and current of the AC step up transformer 29 is obtained as the time difference between the rise-up of the voltage pulse and the peak position of the current waveform. Therefore, the rise-up of the voltage pulse becomes to be taken from the comparison with respect to the output control reference signal 28a, and by the set/reset action of the RS flip-flop 35, the pulse having a pulse width which corresponds to the above-mentioned time difference is generated. The integration circuit 36 executes the integration operation during the time of the output pulse width and thereby a DC voltage proportional to the pulse width is produced.

The phase difference between the primary input voltage and current of the AC step up transformer 29 changes depending on the static capacitance of the high voltage circuit 300, consisting of the step-up transformer 29, a high voltage rectification diode 30, and a capacitor 31, installed inside the container 29a, the inductance of the AC step up transformer 29, and the impedance determined by voltage and current of the high voltage supplied to the discharge electrodes 4a and 4b. Variation of the above-mentioned phase difference due to change in the voltage and current of the high voltage is generally slight, and the change is great when static capacitance, inductance, or the insulating resistance changes due to degradation of the insulation capability of the insulation oil 29b and others in the container 29a of the high voltage circuit. Consequently, by setting reference voltages corresponding to a predetermined allowable range of the above-mentioned phase difference onto reference voltage sources 37a and 37b and making comparison therewith, when the present value of phase deviates from are allowable range, the output of the comparison arithmetic processor 37 changes. Using this way, it becomes possible to monitor the state of the deterioration of the insulation capability inside the container 29a of the high voltage circuit 300.

As a result possible erroneous operation or damage of the high voltage circuit 300 caused by the high voltage noise can be eliminated, and it becomes possible to achieve the stabilization of the discharge current and voltage for the discharge pumping using the glow discharge, and also continuous monitoring of the state of insulation capability in the high voltage power source while keeping the continuous operation becomes possible without stopping the gas laser apparatus.

[Third embodiment]

Apart from the aforementioned second embodiment, the same technical advantage or effect is achievable with such modified embodiment (third embodiment) that, instead of the RMS arithmetic processor 33 of FIG. 4(A), a rectification/smoothing circuit is connected as shown in FIG. 4(B).

Only the different points of the third embodiment from the second embodiment are explained below.

The secondary output of the current detection transformer 32 is connected to a rectification/smoothing circuit 39 and the peak detection circuit 34. A rectifier 40 and a smoothing capacitor 41 constitute a rectification/smoothing circuit 39. One end of the capacitor 41 is grounded, and the other end thereof is connected to the rectifier 40. The rectified and smoothed DC output is fed to the differential amplifier 28 together with the output control reference signal on the signal line 28a, and the output of the differential amplifier 28 is connected to the pulse generator 27.

On the above-mentioned constitution, its operation is explained below.

The signal waveform which is converted from the waveform of the current of the primary coil of the AC step up transformer 29 by the current detection transformer 32 is half-wave-rectified by the rectifier 40 and smoothed by the smoothing capacitor 41. According to the result of measurement made by the present inventor on the relation between the discharge output power and the DC voltage obtained by rectification and smoothing of the primary current, it is shown that there is a proportional relation between those two measured variables. Therefore, the output pulse of the pulse generator 27 can be regulated by an error signal with respect to the control reference signal 28a. As a result, without the necessity of connection to the high voltage circuit the discharge input can be detected; and hence the high voltage output can be regulated without undesirable mixing-in or inducing of the high voltage noise to the high voltage output.

As a result, similarly as in the second embodiment shown in FIG. 4A, possible erroneous operation or damage of the high voltage power source caused by the high voltage noise can be eliminated. And it becomes possible to achieve the stabilization of the discharge current and voltage for the discharge pumping using the glow discharge, and also continuous monitoring of the state of insulation capability in the high voltage power source while keeping the operation becomes possible without stopping the operation of the gas laser apparatus.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What claimed is:

1. A gas laser apparatus comprising:

a laser resonator including an excitation part having a pair of electrode for generating a discharge current therein, thereby causing a glow discharge of a gas laser medium and generating laser light;

a DC high voltage power source for generating DC high voltage power for effecting said glow discharge;

a blower for circulating the gas laser medium;

a cooler for cooling the circulated gas laser medium;

gas conducting tubes for conducting the gas laser medium between said blower and said laser resonator;

at least one resistor connected to an output terminal of said DC high voltage power source for defining a potential thereof;

a current detector which includes a grounded core, a Hall device magnetically coupled to said grounded core and a coil electromagnetically coupled on said core and connected between one end of the output terminal and one of the pair of electrodes; and a voltage regulation means for regulating the output of said DC high voltage power source, said voltage regulation means responding to an output signal from the Hall device of said current detector, thereby regulating the discharge current between the pair of electrodes of the excitation part of the laser resonator.

2. A gas laser apparatus in accordance with claim 1, wherein a resistance value of said resistor is set so that current flowing through said resistor is one-hundredth or less of the discharge current flowing through the excitation part of said laser resonator.

3. A gas laser apparatus in accordance with claim 1, wherein said core is covered by conductive cover having a resistance value which is less than that of the core and grounded by a core grounding terminal proximate to said Hall device on said conductive cover, wherein said Hall device, said core, and said conductive cover are placed in a plural number of insulating covers placed in parallel and coaxial with magnetic field direction, and an insulating material filled in spaces between the Hall device, the core, the conductive cover, and the plural insulator covers, and the coil is wound on said plural insulating covers.

4. A gas laser apparatus in accordance with claim 1 wherein, said current detector is fixed inside of a lid of a current detector case which includes a conductive cover with the core therein, said lid having a signal take-out hole for passing an output line led out through a hole of said conductive cover wherein led out ends of said coil are connected to respective insulated terminals on said current detector case and a grounding line of the core and an output line of the Hall device are taken out through said signal take-out hole and said case is filled with an insulating material.

5. A gas laser apparatus in accordance with claim 4 wherein, said signal take-out hole on the insulator cover in covered by a circuit supporting bracket on which a signal amplifier is mounted, and the output signal from said Hall device is connected to said signal amplifier.

6. A gas laser apparatus comprising:

a laser resonator for generating laser light having an excitation part for discharge-pumping of a gas laser medium, and a high voltage DC power source for generating said discharge-pumping;

a blower for circulating the gas laser medium;

a cooler for cooling the circulated gas laser medium;

gas conducting tubes for conducting the gas laser medium between said blower and said laser resonator;

wherein a primary side of said high voltage DC power source includes a high-frequency AC power source, a step up transformer having a primary side winding, the step up transformer for converting output power of said high-frequency AC power source to a high voltage AC current, and a high voltage rectification circuit for rectifying said high voltage AC current;

a current detector connected in series with the primary side winding of said step up transformer and said high-frequency AC power source; and a power regulating means for regulating said high-frequency AC power source to predetermined variable voltages based on an output signal from said current detector, thereby regulating the discharge current provided to the excitation part of the laser resonator.

7. A gas laser apparatus in accordance with claim 6 wherein the output signal of said current detector is made variable by processing the output signal of the current detector in an RMS arithmetic processor.

8. A gas laser apparatus in accordance with claim 6 wherein the output voltage of said high-frequency AC power source is made variable by processing the output signal of the current detector in a rectification/smoothing circuit comprising a rectifier and a capacitor.

9. A gas laser apparatus in accordance with claim 6 wherein said high-frequency AC power source comprises a DC voltage source, a plurality of switching elements and a pulse generator, a peak detector for detecting the peak of current waveform connected to said current detector, and a time difference detector for detecting the pulse generating time difference between a pulse from said pulse generator and a pulse from said peak detector.

10. A gas laser apparatus comprising:

a laser resonator for generating laser light having an excitation part for discharge-pumping of a gas laser medium, and a high voltage DC power source for generating said discharge-pumping; said high voltage DC power source including a step-up transformer having a primary side windings, said step-up transformer for converting low-voltage high-frequency AC power to high-voltage high-frequency AC power and a high voltage rectification circuit for rectifying said high-voltage high-frequency AC power, a blower for circulating the gas laser medium;

a cooler for cooling the circulated gas laser medium;

gas conducting tubes for conducting the gas laser medium between said blower and said laser resonator;

a high frequency AC power source for generating the low-voltage high-frequency AC power fed to said step-up transformer;

a current detector connected in series with the primary side winding of said step up transformer and said high-frequency AC power source; and a power regulating means for regulating said high-frequency AC power source to predetermined variable voltages based on an output signal from said current detector, thereby regulating the discharge current provided to the excitation part of the laser resonator.

11. A gas laser apparatus in accordance with claim 10 wherein the output signal of said current detector is made variable by a signal obtained by processing the output signal of the current detector in an RMS arithmetic processor.

12. A gas laser apparatus in accordance with claim 10 wherein the output voltage of said high-frequency AC power source is made variable by regulating a signal obtained by processing the output signal of the current detector in a rectification/smoothing circuit comprising a rectifier and a capacitor.

13. A gas laser apparatus in accordance with claim 10 wherein said high-frequency AC power source comprises a DC voltage source, a plurality of switching elements for allowing and stopping conduction of current from said DC voltage source, and a pulse generator for controlling said switching elements, a peak detector for detecting the peak of current waveform connected to said current detector, and a time difference detector for detecting the pulse generating time difference between a pulse from said pulse generator and a pulse from said peak detector.

* * * * *